UNITED STATES PATENT OFFICE.

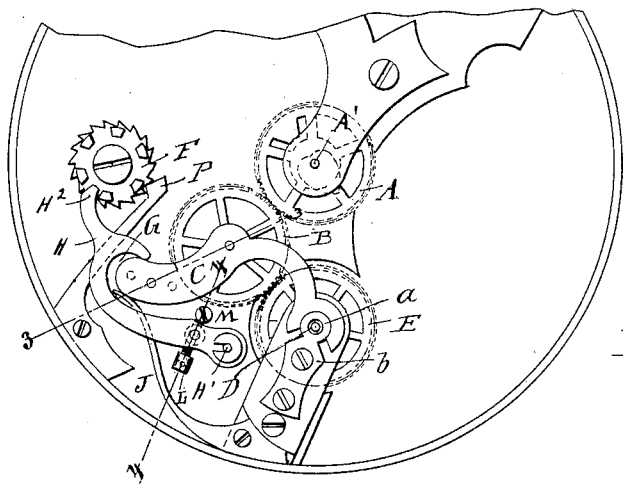

HENRY A. LUGRIN, OF BROOKLYN, NEW YORK, ASSIGNOR TO ALBERT WITTNAUER, OF NEW YORK, N. Y.

STOP-WATCH.

SPECIFICATION forming part of Letters Patent No. 588,344, dated August 17, 1897.

Application filed March 11, 1896. Serial No. 582,731. (No model.) Patented in Switzerland November 4, 1892, No. 5,821.

*To all whom it may concern:*

Be it known that I, HENRY A. LUGRIN, a citizen of the United States, and a resident of Brooklyn, in the county of Kings, State of New York, have invented certain new and useful Improvements in Stop-Watches, (for which I have obtained a patent in Switzerland, No. 5,821, dated November 4, 1892,) of which the following is a specification.

This invention relates to improvements in stop-watches, and especially to that class of stop-watches having three finely-toothed wheels which are in the same plane and are thrown in and out of gear to start and stop the fly-back hands.

The object of my invention is to provide a new and improved device for shifting said wheels to throw them in and out of gear, which device is so constructed that the mesh of said wheels can be adjusted without influencing the engagement of said shifting device with the usual ratchet-wheel used for operating said shifting device.

In the accompanying drawings, forming a part of this specification, and in which like letters of reference indicate like parts in all the views, Figures 1 and 2 are face views of part of a watch-movement provided with my improvement. Fig. 3 is a detail vertical sectional view on the line 3 3 of Fig. 1. Fig. 4 is a vertical sectional view on the line 4 4 of Fig. 1.

The finely-toothed wheel A is fixed on the central arbor A', which operates a fly-back hand, (not shown,) and is of the well-known construction and arrangement. With it can be engaged the finely-toothed wheel B, mounted between a pivoted lever C and a bridge C', secured to the under side of said lever, as shown in Fig. 3. The lever C is mounted to swing on a neck *a* of a bridge *b*, which neck surrounds and is concentric with the arbor D of a finely-toothed wheel E, which at all times remains in engagement with the wheel B, said arbor D being the arbor of the fourth wheel of the watch-movement. By moving the lever C toward the center arbor the wheel B is engaged with the wheel A, and by moving the lever from said center arbor the wheels A and B are disengaged, the wheels B and E at all times remaining in engagement, as said wheel E turns on the same center on which the lever C swings. This arrangement is well known, and in the watches constructed in this manner heretofore the free end of the lever C was pressed by a suitable spring in engagement with a ratchet-wheel F, so that by rotating said ratchet-wheel the lever C was moved toward and from the center wheel. This construction had the defect that when the bridge *b* was shifted to regulate the mesh of the wheels B and E the engagement of the free end of the lever C and the ratchet-wheel F was also changed, and in consequence thereof it very frequently occurred that by properly adjusting the mesh of the wheels B and E the engagement of the free end of the lever C with the ratchet-wheel F was so changed that the stopping and starting device did not operate properly. To avoid this, I do not extend the lever C to the ratchet-wheel F, but place the free end of the lever C into a notch G of an intermediate lever H, pivoted at H' and having its free end H² pressed into engagement with the teeth of the ratchet-wheel F by a spring J, which bears on the lever C, and the latter in turn transmits the pressure to the lever H.

The lever H is provided on its under side with a lug K, through which a set-screw L is screwed, the free end of which can rest against a stop M on the plate O.

The bridge *b* can be shifted slightly for regulating the mesh of the wheels B and E without in the least influencing the engagement of the end of the lever H with the ratchet-wheel F, as the free end of the lever C can be shifted more or less in the recess G of the lever H without affecting said lever H.

By means of the screw L the lever H can readily be adjusted according to the desired mesh of the wheels A and B, and at the same time the engaging of the end H² of the lever H with the ratchet-wheel F is changed correspondingly.

P is the spring check-pawl for the ratchet-wheel F.

Having thus described my invention, what I claim as new, and desire to secure by Letters Patent, is—

1. In a stop-watch, the combination with a central toothed wheel, of a toothed wheel on the fourth-wheel arbor, a pivoted lever having its pivotal point concentric with the fourth-wheel arbor, a toothed wheel mounted on said pivoted lever and constantly engaged with the toothed wheel on the fourth-wheel arbor, and adapted to be engaged with the central toothed wheel, a ratchet-wheel, a pivoted spring-pressed intermediate lever, having its free end engaged with the teeth of the ratchet-wheel and which lever is also engaged with the free end of the lever carrying the toothed wheel and an adjustable stop for adjusting the throw of the intermediate lever, substantially as herein shown and described.

2. In a stop-watch, the combination with a central toothed wheel, of a toothed wheel on the fourth-wheel arbor, a pivoted lever having its pivotal point concentric with the fourth-wheel arbor, a toothed wheel mounted on said pivoted lever and constantly engaged with the toothed wheel on the fourth-wheel arbor, and adapted to be engaged with the central toothed wheel, a ratchet-wheel, a pivoted spring-pressed intermediate lever, having its free end engaged with teeth of the ratchet-wheel and which lever is also engaged with the free end of the lever carrying the toothed wheel, a lug on the under side of said intermediate lever, a set-screw in said lug, and a stop on the plate of the movement against which stop the end of said screw can rest, substantially as herein shown and described.

In testimony that I claim the foregoing as my invention I have signed my name, in presence of two witnesses, this 28th day of February, 1896.

HENRY A. LUGRIN.

Witnesses:
OSCAR F. GUNZ,
N. M. FLANNERY.